(12) United States Patent
Roberts, Jr.

(10) Patent No.: US 9,181,980 B2
(45) Date of Patent: Nov. 10, 2015

(54) FLUID BEARINGS WITH ADJUSTABLE FRICTIONAL LOAD CHARACTERISTICS

(71) Applicant: Southwest Research Institute, San Antonio, TX (US)

(72) Inventor: Charles E. Roberts, Jr., Helotes, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 303 days.

(21) Appl. No.: 13/661,931

(22) Filed: Oct. 26, 2012

(65) Prior Publication Data

US 2013/0114919 A1    May 9, 2013

Related U.S. Application Data

(63) Continuation-in-part of application No. 13/184,097, filed on Jul. 15, 2011, now Pat. No. 8,955,224.

(60) Provisional application No. 61/553,080, filed on Oct. 28, 2011.

(51) Int. Cl.
| | |
|---|---|
| *F16C 32/06* | (2006.01) |
| *F16C 39/04* | (2006.01) |
| *F16C 9/00* | (2006.01) |

(52) U.S. Cl.
CPC ........... *F16C 32/0629* (2013.01); *F16C 32/064* (2013.01); *F16C 32/067* (2013.01); *F16C 39/04* (2013.01); *F16C 9/00* (2013.01); *Y10T 29/497* (2015.01); *Y10T 29/49639* (2015.01)

(58) Field of Classification Search
CPC .. F16C 32/0629; F16C 32/067; F16C 32/064; F16C 39/04; F16C 9/00; Y10T 29/497; Y10T 29/49639

USPC ............ 29/898.08, 898.09, 898.02; 384/100, 384/101, 107, 114

See application file for complete search history.

(56) References Cited

U.S. PATENT DOCUMENTS

| | | | |
|---|---|---|---|
| 3,708,215 A | 1/1973 | Wilcock et al. |
| 4,175,799 A | 11/1979 | Davis et al. |
| 4,243,274 A | 1/1981 | Greene |
| 4,268,094 A | 5/1981 | Greene |
| 5,455,778 A | 10/1995 | Ide et al. |
| 5,459,674 A | 10/1995 | Ide et al. |
| 5,513,917 A | 5/1996 | Ide et al. |

(Continued)

FOREIGN PATENT DOCUMENTS

WO    94/00819    1/1994

OTHER PUBLICATIONS

U.S. Office Action, mail date Jul. 18, 2014, issued in related U.S. Appl. No. 13/184,097 (7 pgs).

*Primary Examiner* — Ryan J Walters
(74) *Attorney, Agent, or Firm* — Grossman, Tucker et al

(57) ABSTRACT

An aspect of the present disclosure relates to a fluid bearing having an adjustable effective surface area and a method of adjusting the load carrying capacity of a fluid bearing. The fluid bearing may include a bore defining a central longitudinal axis and lubricating fluid provided within the bore. The fluid bearing may also include a bearing including a bearing surface, wherein at least a portion of the bearing is positioned within the bore. An adjustable effective bearing surface area may also be provided. The method includes adjusting effective bearing surface area of the bearing.

6 Claims, 16 Drawing Sheets

(56) References Cited

U.S. PATENT DOCUMENTS

| | | | |
|---|---|---|---|
| 5,711,074 A * | 1/1998 | Harimoto et al. | 29/898.066 |
| 5,743,654 A | 4/1998 | Ide et al. | |
| 6,460,635 B1 | 10/2002 | Kalsi et al. | |
| 6,502,989 B1 | 1/2003 | Takeuchi et al. | |
| 6,766,697 B1 | 7/2004 | Perez et al. | |
| 2006/0251859 A1 | 11/2006 | D'Urso | |
| 2007/0245563 A1 | 10/2007 | Smith | |
| 2013/0016931 A1 | 1/2013 | Roberts, Jr. | |
| 2014/0026843 A1 | 1/2014 | Florea et al. | |

* cited by examiner

FLUID BEARINGS WITH ADJUSTABLE FRICTIONAL LOAD CHARACTERISTICS

CROSS REFERENCE TO RELATED APPLICATIONS

The present application claims the benefit of the filing date of U.S. provisional application ser. No. 61/553,080, filed Oct. 28, 2011, the teachings of which are incorporated herein by reference. In addition, the present application is a continuation-in-part of U.S. patent application Ser. No. 13/184,097, filed Jul. 15, 2011, the teachings of which are incorporated herein by reference.

FIELD OF THE INVENTION

The present disclosure relates generally to fluid bearings and, in particular, to fluid bearings with adjustable frictional load characteristics.

BACKGROUND

Fluid bearings may be designed to provide hydrodynamic load bearing capability across a range of operating conditions. However, the wetted-load carrying area of the bearing, for example, may be of generally fixed geometry. Because the load-carrying capacity of the bearing may be proportional to the bearing surface area, the bearing may effectively be overdesigned for certain operating conditions where the instantaneous load bearing capacity may be above the actual load at the time. Consequently, at operating conditions where the bearing capacity may be higher than the actual load, the carrying area and, therefore, viscous drag of the bearing may be higher than that which would occur for a bearing designed to accommodate the actual load.

SUMMARY OF THE INVENTION

An aspect of the present disclosure relates to a method of adjusting the load carrying capacity of a fluid bearing including a bore defined in the fluid bearing and a rotatable bearing including a rotatable bearing surface. The method may include contacting a lubricating fluid in the bore with at least a portion of the rotatable bearing surface, wherein an effective bearing surface area is provided where the lubricating fluid contacts the rotatable bearing surface. The method may also include altering the effective bearing surface area, by either increasing or reducing the area of the rotatable bearing surface which is contacted by the lubricating fluid.

Another aspect of the present disclosure relates to a fluid bearing having an adjustable effective surface area. The fluid bearing may include a bore defined in the fluid bearing, a rotatable bearing including a rotatable bearing surface, wherein at least a portion of the rotatable bearing surface is positioned in the bore, lubricating fluid provided within the bore, and an adjustable effective bearing surface area defined by the area of the rotatable bearing surface positioned in the bore contacted by the lubricating fluid.

A further aspect of the present disclosure relates to a method of adjusting the load carrying capacity of a fluid bearing including a bore defining a longitudinal axis and a bearing including a bearing surface. The method may include contacting a lubricating fluid in the bore with at least a portion of the bearing surface, wherein an effective bearing surface area is provided where the lubricating fluid contacts the bearing surface. The method may also include altering the effective bearing surface area by either increasing or reducing the area of the bearing surface which is contacted by the lubricating fluid.

Yet a further aspect of the present disclosure relates to a method of adjusting the load carrying capacity of a fluid bearing. The method may include providing a bearing including a bearing surface, wherein the bearing surface exhibits a length and the length varies at different points around the circumference of the bearing. An effective bearing surface area may be provided where the bearing surface contacts a second surface in the fluid bearing. The method may also include altering the effective bearing surface area by contacting the bearing surface with the second surface at different points around the circumference of the bearing.

An additional aspect of the present disclosure relates to a fluid bearing having an adjustable effective surface area. The fluid bearing may include a bore defining a central longitudinal axis and lubricating fluid provided within the bore. The fluid bearing may also include a bearing including a bearing surface, wherein at least a portion of the bearing is positioned within the bore. An adjustable effective bearing surface area may also be provided. In one embodiment, the bore may be defined in the first end of a piston connecting rod and a portion of a crankshaft may be received in the bore.

BRIEF DESCRIPTION OF THE DRAWINGS

The above-mentioned and other features of this disclosure, and the manner of attaining them, may become more apparent and better understood by reference to the following description of embodiments described herein taken in conjunction with the accompanying drawings, wherein.

DETAILED DESCRIPTION

Figure 1:
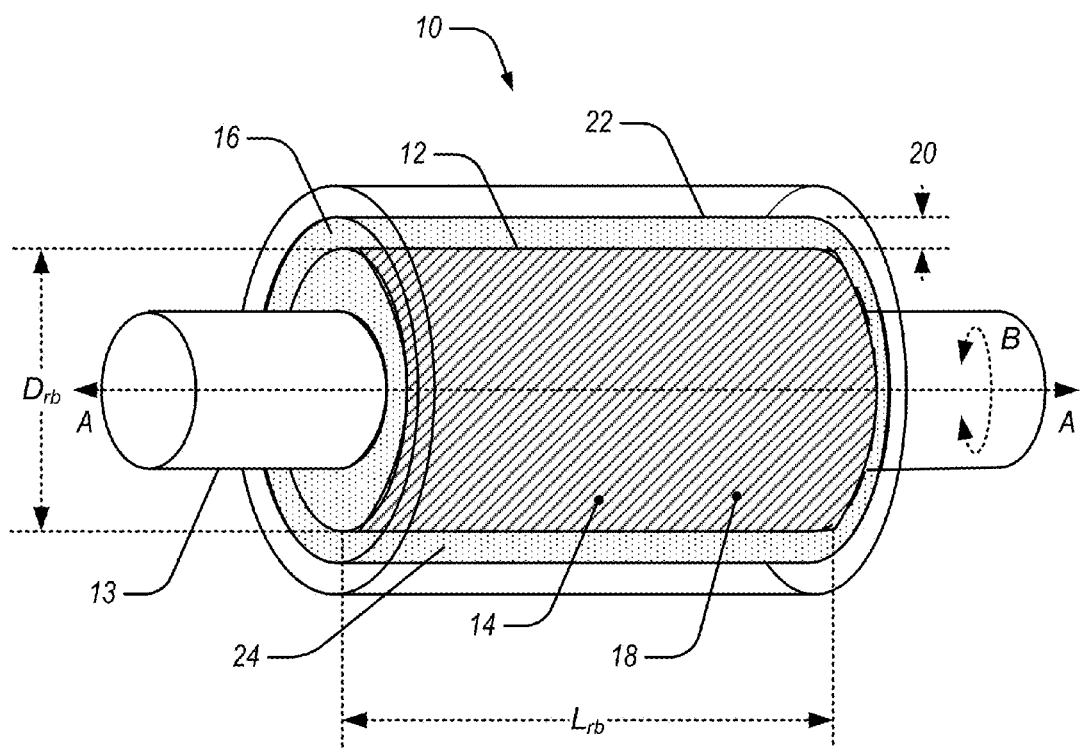
FIG. 1 illustrates a front perspective view of an example of a fluid bearing.

It is to be understood that this disclosure is not limited in its application to the details of construction and the arrangement of components set forth in the following description or illustrated in the drawings. The embodiments herein are capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

As noted above, fluid bearings may be designed to provide hydrodynamic load bearing capability across a range of operating conditions. The present disclosure relates generally to fluid bearings and, in particular, to fluid bearings with adjustable frictional load characteristics. The bearing load may be supported by lubricating fluid, which may contact a rotatable bearing surface or journal within a bore or sleeve defined in the fluid bearing.

Fluid bearings may generally include, for example, hydrostatic bearings or hydrodynamic bearings. Hydrostatic fluid bearings may be understood as fluid bearings wherein the fluid may be pressurized and pumped into the bearing through an inlet. Hydrodynamic bearings may be understood as fluid bearings wherein the bearing rotation itself may draw the fluid on to the inner surface of the bearing, forming a lubricating wedge of film under or around the rotatable bearing surface. Hydrodynamic bearings may also utilize a pump or a secondary bearing to aid in start up, shut down or both.

A number of factors may affect the performance of a fluid bearing. The diameter and length of the rotatable bearing (or journal), the gap between the bearing surface and the bore (or sleeve) in which the bearing rotates in, surface roughness and lubricating fluid properties will all affect the load bearing capacity of a fluid bearing. The performance of the bearing may also be affected by a number of factors such as viscous drag. Without being limited to any particular theory, the viscous drag of a fluid bearing may be generally stated as follows.

$$DragForce = A\vartheta \frac{\delta v}{\delta y}$$

In the above formula, the drag force is proportional to the effective bearing area, A, the fluid viscosity $\Theta$, and the spatial rate of change of the velocity in the bearing gap, $\delta v/\delta y$. Furthermore, the load-carrying capacity of the bearing, such as the ability to maintain a minimum oil-film thickness, i.e., the ability to operate without surface-to-surface contact, may be understood as a function of the effective bearing area. Fluid bearings may be designed to operate at a range of loads up to a maximum load, wherein the above parameters are set, i.e., length, diameter, surface area, etc. based on the maximum bearing capacity, regardless of the instantaneous load (i.e., the actual load on the bearing). However, there may be times where the instantaneous load may be less than the maximum bearing capacity. In such situations, losses, such as viscous drag, may be greater than that experienced by a fluid bearing that is specifically designed for the instantaneous load. Provided herein are fluid bearings and methods for reducing the viscous drag flow of fluid bearings when the instantaneous load may be less than the maximum bearing capacity.

FIG. 1 illustrates an embodiment of a fluid bearing 10, which includes a rotatable bearing 12 provided on a shaft 13. The rotatable bearing 12 includes a surface 14, positioned within a bore 16, wherein the effective bearing area 18 as shown is the area of the rotatable bearing surface 14 located within the bore 16 and contacted by the lubricating fluid 24. As illustrated, the effective bearing area 18 is the shaded area with parallel lines (in this example the effective bearing area 18 is substantially equivalent to the entire surface 14 of the rotating bearing 12 located within the fluid bearing 10). The rotatable bearing 12 may be formed integrally with the shaft 13 or may be coupled to the shaft 13. Furthermore, as illustrated, the rotatable bearing 12 and bore 16 may be generally cylindrical. In other embodiments, the rotatable bearing 12 and bore 16 may be in the form of frustro-conical, hemispherical, spherical or other shapes. A bearing gap 20 may be provided between the wall 22 of the bore 16 and the rotatable bearing 12.

Figure 4:
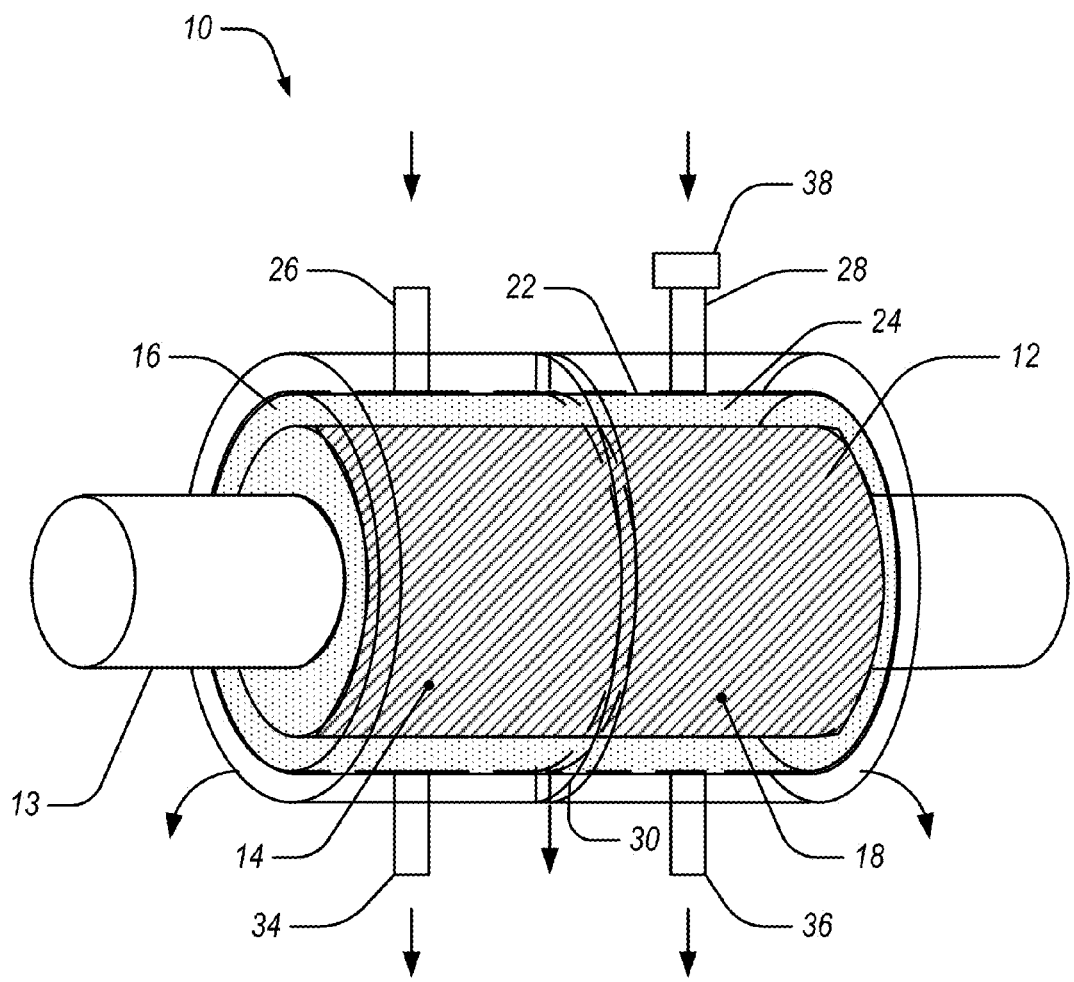
FIG. 4 illustrates a front perspective view of another embodiment of a fluid bearing including lubricating fluid partition outlet positioned between two laterally spaced lubricating fluid inlets.
Figure 5:
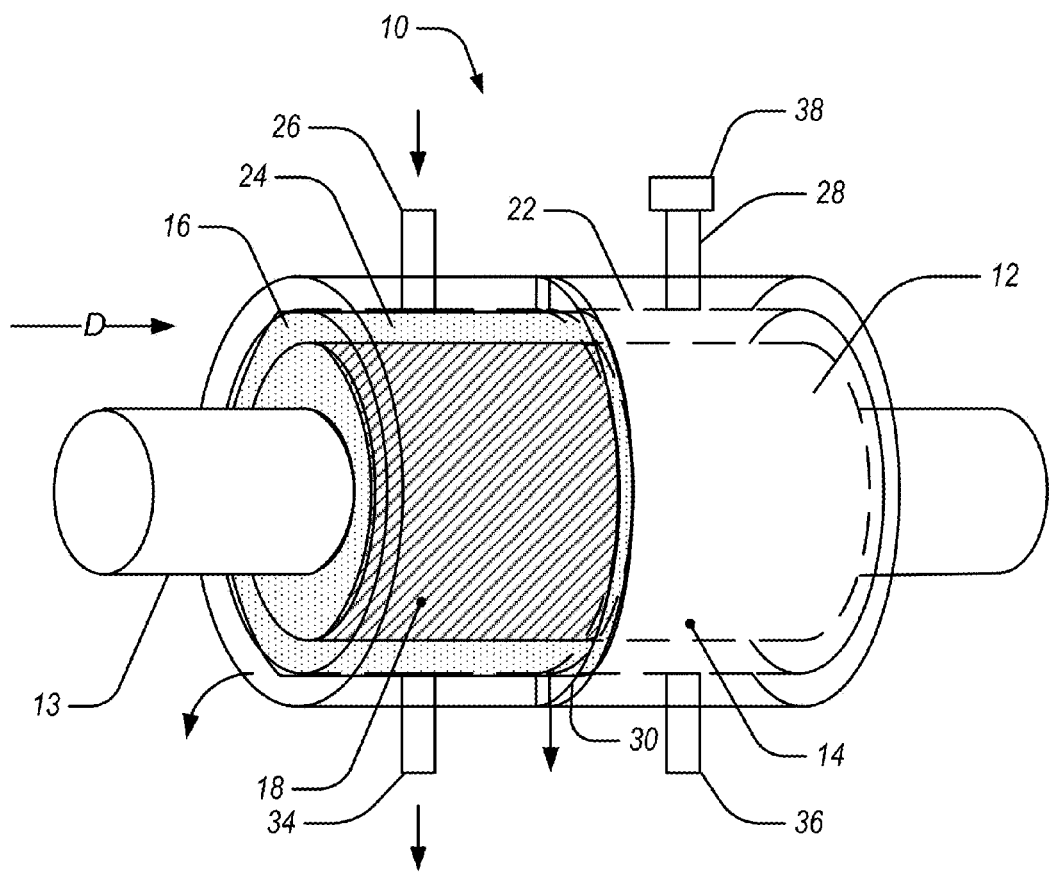
FIG. 5 illustrates a front perspective view of the embodiment of the fluid bearing illustrated in FIG. 4, wherein the flow into one of the lubricating fluid inlets is restricted, reducing the effective bearing surface area.

As alluded to above, lubricating fluid 24 may surround the rotatable bearing 12 positioned within the bore 16. The lubricating fluid may include preferably include a liquid, such as water or oil. In some embodiments, the lubricating fluid may be relatively viscous, wherein the lubricating fluid viscosity may be in the range of 50 cP or greater, such as in the range of 50 cP to 10,000 cP, including all values and ranges therein, such as 100 cP to 1,000 cP, 1,000 cP to 3,000 cP, etc. The lubricating fluid may be supplied to the bearing continuously and/or intermittently during operation or once upon bearing assembly or during bearing maintenance. In one embodiment, (as illustrated in FIGS. 4 and 5 discussed further herein) inlets and outlets may be provided in fluid communication with the bore. At least one inlet and at least one outlet may be provided or a plurality of inlets and outlets may be provided.

The lubricating fluid in the fluid bearing may be fully-flooded, where the lubricant may fill space in the bore between the bore wall and the rotatable bearing; or partially starved, where the lubricant may fill less than all of the space in the bore between the bore wall and the rotatable bearing. Where the lubricating fluid may be fully-flooded, the lubricating fluid may, in some cases, be under pressure, wherein the pressure may be developed by a pump. In some embodiments, the lubricating fluid may be supplied from a reservoir (not illustrated), which is in fluid communication with the inlets and/or outlets and passed through the bearing bore 16 continuously or intermittently.

Referring again to FIG. 1, the rotating bearing 12 may generally rotate around axis A-A in the general direction of arrow B. Axis A-A may generally be perpendicular to the opening of the bore 16. In some embodiments, axis A-A may also be generally parallel a central axis defined by the bore 16, which as illustrated may be coincident with axis A-A. It may be appreciated, however, that the rotating bearing 12 may not necessarily rotate concentric to the central axis of the bore 16, but may rotate in an eccentric manner around the central axis of the bore 16. The area of the rotating bearing surface 14 may generally be defined by a length $L_{rb}$ and a circumference $C_{rb}$, which may be calculated from the rotating bearing diameter $D_{rb}$.

Figure 2:
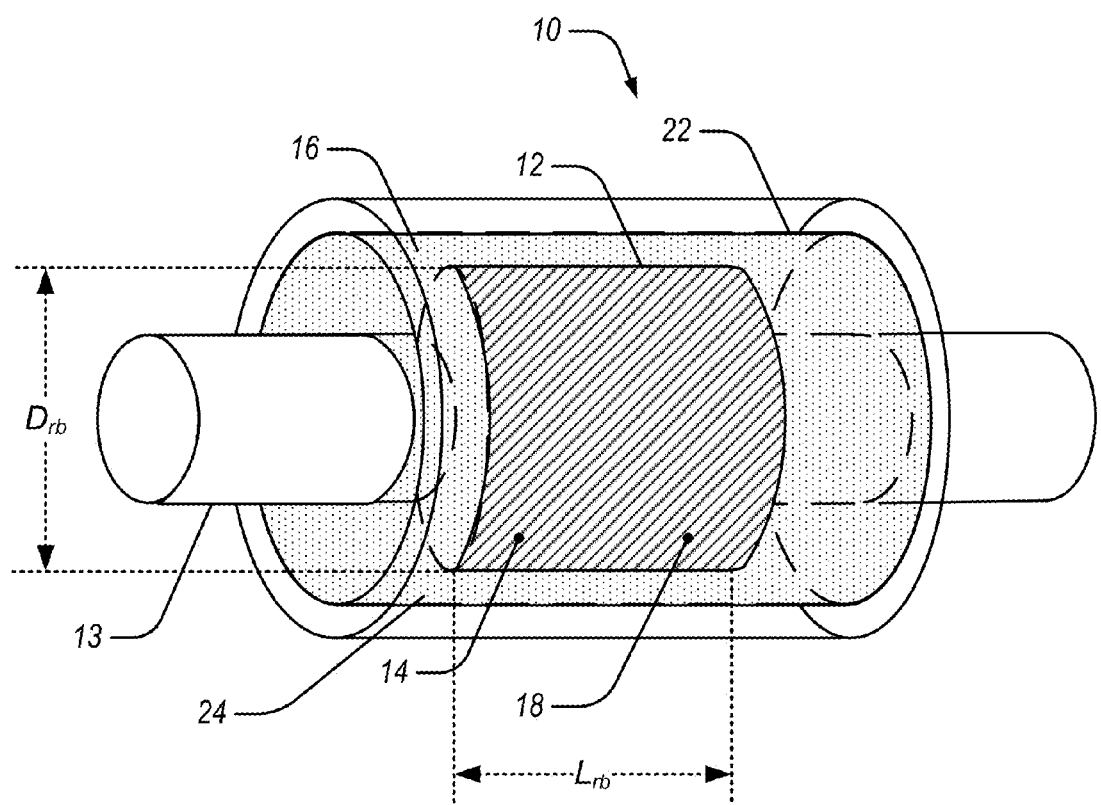
FIG. 2 illustrates a front perspective view of the fluid bearing of FIG. 1, wherein the rotatable bearing surface area is reduced, reducing the effective bearing surface area.

As noted above, by altering the size of the effective bearing surface area when operating at capacities less than the maximum bearing capacity, the drag force may be reduced. The effective bearing surface area 16 may generally be reduced by reducing the area of the rotatable bearing surface 14 that contacts the lubricating fluid in the bore 16 of the fluid bearing 10. FIG. 2 illustrates an embodiment wherein the length $L_{rb}$ of the rotating bearing 12 may be reduced, reducing the area of the rotating bearing surface 14. This may, therefore, reduce the effective bearing surface area 18 of the fluid bearing 10. The length $L_{rb}$ of the rotating bearing 12 may be reduced from a first length $L_{rb1}$ providing a maximum bearing capacity to a second length $L_{rb2}$ by a factor of x selected for the instantaneous load of the fluid bearing calculated by methods known by a person of ordinary skill in the art, where $L_{rb2}=xL_{rb1}$, where x is in the range of 0.1 to 0.99, including all values and ranges therein, such as 0.25 to 0.75, etc.

In the embodiment of FIG. 2, the effective bearing surface area 18 and the area of the rotatable bearing surface 14 are reduced relative to the length of the bore and as shown, are the same. In this embodiment, the rotatable bearing 12 may be reduced by forming the rotating bearing 12 out of, for example, a sliding or telescopic sleeve, which may be mechanically or hydraulically contracted or expanded over the shaft 13. It may be appreciated that the size of the effective bearing surface area may be increased by increasing the length $L_{rb}$ of the rotating bearing 12 up to a maximum length selected for the maximum bearing capacity.

Figure 3:
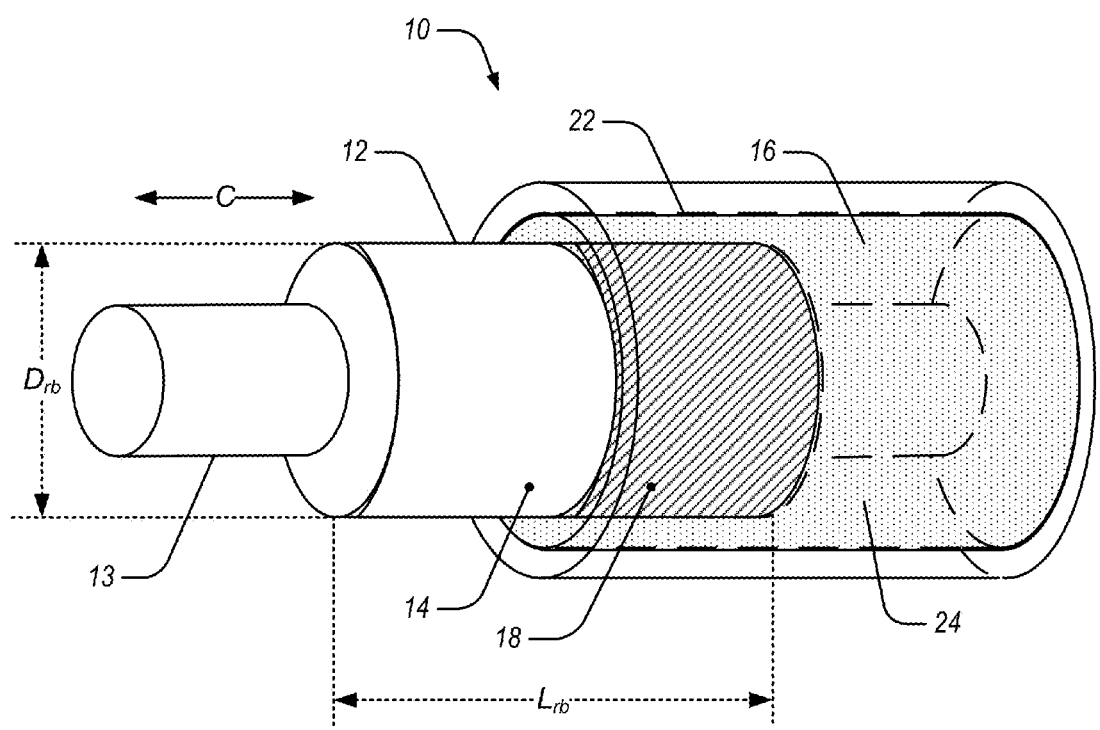
FIG. 3 illustrates a front perspective view of an example of a fluid bearing, wherein the rotatable bearing surface is laterally displaced relative to the bore of the bearing, reducing the effective surface bearing area.

In another embodiment, illustrated in FIG. 3, the effective bearing surface area 18 may be reduced by adjusting the area of the rotatable bearing surface 14 positioned in the bore 16. This may be accomplished by removing a portion of the rotatable bearing 12 from within the bore 16. The rotatable bearing 12 may be displaced laterally from the bore 16, in direction of arrow C either by moving the rotatable bearing 12 or the wall 22 and bore 16. The displacement may be accomplished mechanically, electrically, magnetically, hydraulically, or combinations thereof. In reducing the area of the rotatable bearing surface 14 in the bore 16, less area of the rotatable bearing surface 14 may contact the lubricating fluid 24 within the bore 16 reducing the viscous drag.

In such an embodiment, the effective bearing surface area 18 may be less than the area of the rotatable bearing surface 14 and the relationship between the effective bearing surface area 18 and the rotatable bearing surface area 14 may be represented by the following formula, $A_e=yA_{rb}$, wherein $A_e$ is the effective bearing surface area, $A_{rb}$ is the rotatable bearing surface area (a fixed value) and y is in the range of 0.1 to 0.99, including all values and ranges therein such as from 0.25 to 0.75, etc.

The effective bearing surface area may also be understood as capable of being reduced from a first effective bearing surface area $A_{e1}$ exhibited when the fluid bearing is operating at maximum capacity to a second effective bearing surface area $A_{e2}$ selected for the instantaneous load of the bearing by a factor of z, wherein $A_{e2}=zA_{e1}$ and z is in the range of 0.1 to 0.99, including all values and ranges therein, such as from 0.25 to 0.75, etc. It may further be appreciated that the effective bearing surface area may be increased by increasing the portion of the rotatable bearing 12 and the area of the rotatable bearing surface 14 in the bore 16, by laterally displacing the rotatable bearing 12 back into the bore 16.

In other embodiments, the effective bearing surface area 18 may also be altered by adjusting the flow of the lubricating fluid over the rotatable bearing surface 14 altering the area of the rotatable bearing surface 14 that is contacted by the lubricating fluid. The flow may be adjusted by adjusting the volumetric or flow rate of the lubricating fluid passing through the inlets and outlets of the bearing. Increasing the area of the rotatable bearing surface that is contacted by the lubricating fluid may increase the effective bearing surface area and decreasing the area of the rotatable bearing surface that is contacted by the lubricating fluid may decrease the effective bearing surface area.

FIGS. 4 and 5 illustrate an embodiment wherein the effective bearing surface area 18 may be adjusted by adjusting flow through the lubricating fluid inlet ports 26, 28. Generally, the fluid bearing 10 may include one or more lubricating fluid inlet ports 26, 28 and one or more lubricating fluid outlet ports 30, 34, 36. In this embodiment, the fluid bearing 10 includes at least two lubricating fluid inlet ports 26, 28 and at least one partition lubricating fluid outlet port 30. Additional lubricating fluid outlet ports 34, 36 may be present as well.

The two lubricating fluid inlet ports 26, 28 may be spaced laterally along the wall 22 of the bore 16. In addition, as illustrated the lubricating fluid inlet ports 26, 28 may be positioned at generally the same location around the circumference of the wall 22 as illustrated or the position of lubricating fluid inlet ports 26, 28 may be offset or staggered around the circumference of the wall 22, such that the ports may be located from 1° to 359° from each other when viewing the bearing from the side in the direction of arrow D as illustrated in FIG. 5.

Furthermore, when a partition lubricating fluid outlet port 30 is present, the partition outlet port 30 may be positioned between the lubricating fluid inlet ports 26, 28. As illustrated, the partition outlet 30 may be preferably positioned halfway between the adjacent lubricating fluid inlet ports 26, 28; however, it may be appreciated that the partition outlet 30 may be positioned at different spacings between the fluid inlet ports as well, such as a quarter of the way from either of the adjacent inlet ports, a third of the way from either of the adjacent inlet ports, etc. In this embodiment, the partition outlet port 30 may be in the shape of a groove that passes through the wall 22. Other geometries may also be contemplated for the partition outlet port 30, such as a single through hole or a dashed through hole configuration, wherein the through holes may be circular, square, rectangular, etc.

To control or alter the effective bearing surface area, flow of the lubricating fluid through one of the inlet ports, such as port 28, may be reduced or eliminated, using, for example, a valve 38, as illustrated in FIG. 5. The valve 38 may be generally understood as a device configured to reduce or eliminate the flow of the lubricating fluid. Upon activating valve 38, at least a portion of or all of the lubricating fluid may drain out of the bore through partition outlet port 30 before flowing down the length of the bore in the direction illustrated by arrow D. In such a manner, a portion of the area of the rotating bearing surface 14 may not be substantially contacted by the lubricating fluid 24, reducing the effective bearing surface area 18. Accordingly, the partition outlet port 30 may act as a partition or trench. The outlets may provide additional drainage, which may further reduce the ability of the lubricating fluid to flow along the length of the bore and/or contact the rotatable bearing surface.

Figure 6:
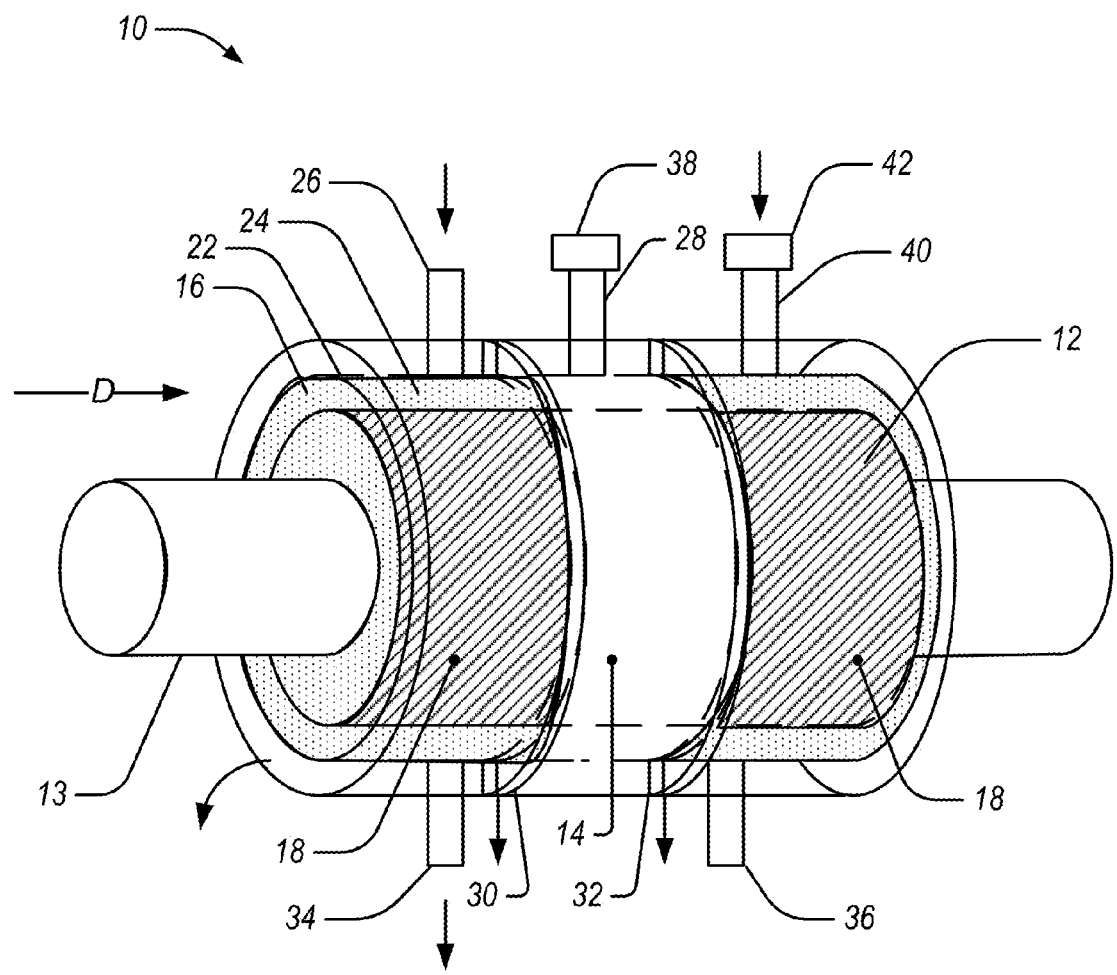
FIG. 6 illustrates a front perspective view of an embodiment of a fluid bearing, wherein the flow into one of the lubricating fluid inlets is restricted, reducing the effective bearing surface area.

In other embodiments, such as illustrated in FIG. 6, additional fluid inlet ports, such as inlet port 40 may be present spaced laterally from an adjacent lubricating fluid inlet port 28. In such a manner, an additional partition outlet 32 may be provided between inlet port 40 and the adjacent inlet port 28. The additional inlet port may also include a valve 42, which may be operated independently of the other inlet valves present. The additional partition outlet 32 may provide additional partitions or trenches along the length of the rotating bearing surface 14 allowing for increased control in regulating the effective bearing surface area 18. As illustrated, two-thirds of the rotating bearing surface area 14 is contacted with lubricating fluid 24. Thus, the effective bearing surface area is two-thirds 18 of the rotating bearing surface area 14. In addition, as illustrated, valve 42 may be open and lubricating fluid 24 may be supplied through inlet ports 26 and 40. In other embodiments, other valve combinations may be open or closed. For example, valves 38 and 42 or valves 26 and 38 may be closed and only one-third of the rotating bearing surface area 14 may be contacted with lubricating fluid 24. In yet other embodiments, flow of lubricating fluid through the lubricating fluid outlets, including the partition outlets or additional outlets, may be restricted or eliminated to further alter the lubricating fluid flow.

Figure 7:
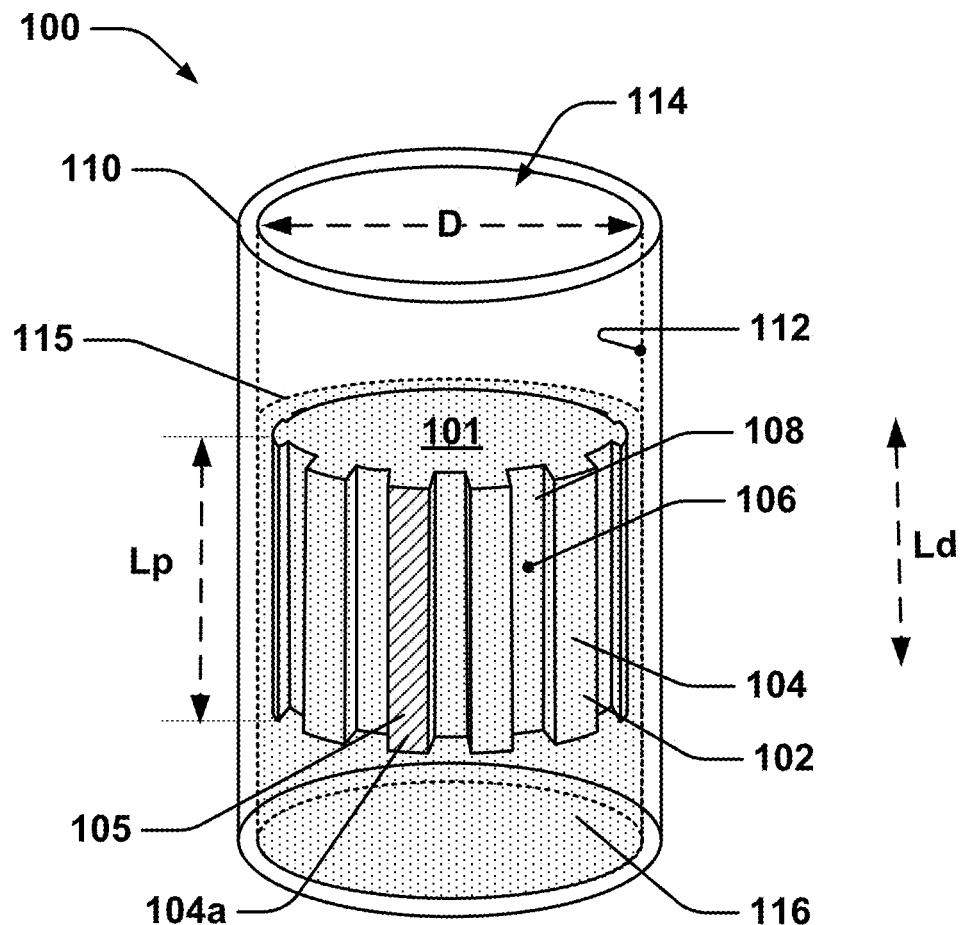
FIG. 7 illustrates a front perspective view of another embodiment of a fluid bearing, wherein a laterally displaced piston includes a number of raised pads positioned around the circumference of the piston, wherein the pad plateaus form a bearing surface.

FIG. 7 illustrates yet an additional embodiment of a fluid bearing 100. In this embodiment, a fluid bearing may be provided as between a piston 101 and a piston cylinder 110. (The piston head and connecting rod are not illustrated.) The cylinder 110 may include a cylinder liner or wall 112 defining a cylinder bore 114. The cylinder bore 114 may exhibit a cross-sectional diameter D. The piston 101 may ride or move within the cylinder bore 114, exhibiting motion up and down, i.e., back and forth, along the length of the cylinder bore 114 in the lateral direction Ld.

The piston 101 may include a piston skirt 102, which may be understood as the portion of a piston 101 that forms the bearing surface of the piston relative to the cylinder wall or liner 112. Lubricating fluid 116 may be provided within the cylinder bore 114 and allowed to drain out of the bottom of the cylinder bore 114. A seal (not illustrated) may be provided at the top portion 105 of the piston skirt 102 to prevent lubricating fluid 116 from entering the combustion chamber, which may be understood as the volume defined by the piston head, the cylinder head and the cylinder bore.

The piston skirt 102 may include a number of pads 104 spaced around the circumference of the piston 101, which are raised from the surface 106 of the piston 101. The pads 104 may extend along a portion of the length Lp of the piston skirt 102 or along the entire length Lp of the piston skirt 102. The pads 104 may be formed, for example, by machining reliefs 108 into the piston wall around the exterior surface of the piston 101. The plateau area 105 (illustrated by the hatched portion of pad 104*a*) may form the bearing surface of each pad 104 and collectively of the piston 101 forming the piston skirt 102.

Figure 8:
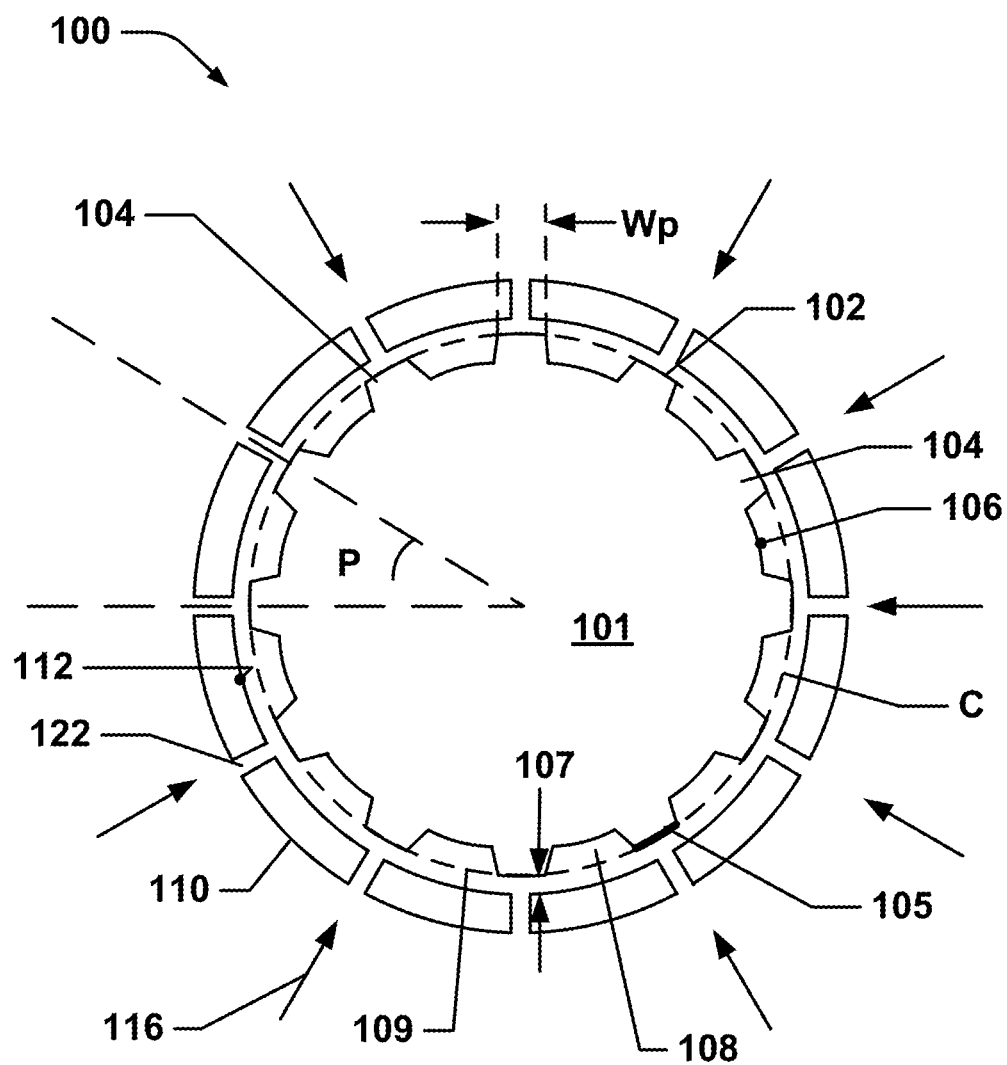
FIG. 8 illustrates a top view of the fluid bearing of FIG. 7 including inlet ports for providing lubricating fluid to the bearing surfaces.

FIG. 8 illustrates a top down view of the piston 101 relative to the cylinder 110. As illustrated, the piston skirt 102 may include a number of pads 104 spaced radially around the circumference C (illustrated in dotted line) defined by the piston skirt 102. Again, reliefs 108 may be provided or defined between the pads 104. As illustrated, twelve pads are provided spaced at a pitch P of 30 degrees measured, for example, from the center of two adjacent pads. However, from 4 to 20 pads may be provided spaced at various pitches from 18 to 90 degrees around the circumference of the piston 101. Further, the plateau portion 105 (highlighted by the darkened line) of the pads 104 may form approximately 25% to 95% of the circumference C defined by the piston skirt 102, including all values and ranges therein, e.g., 50%, 75%, etc., wherein the remainder of the circumference includes the relief openings 109. A bearing gap 107 may be provided between the pad plateaus 105 and the cylinder wall 112.

One or more fluid inlets 122 may be provided relative to each pad 104, which provide lubricating fluid 116 to the cylinder 110. In an embodiment, the centerline of a fluid inlet may generally coincide with the center of the pad width Wp. Where multiple fluid inlets are present, for each pad, the inlets may be arranged along the length of the piston Lp. To adjust the effective bearing area 120, the number of pads 104 (and therefore pad plateaus 105) to which lubricating fluid 116 is provided to may be varied depending, for example, on the engine load. Thus, the provision of lubricating fluid 116 to the pads 104 may be controlled by regulating the inlets 122 through which fluid may be provided. The inlets may be regulated, for example, by opening and closing valves associated with the inlets. By increasing or reducing the area of the bearing surface (or number of pad plateaus) that is contacted by the lubricating fluid, the effective bearing surface area may be altered.

In one non-limiting example, during high engine load operating conditions, where the demand for power placed on the engine—and therefore the piston—may be relatively greater, fluid may be provided to more than 50% of the pads 104, such as from greater than 50% to 100% of the pads, including all values and ranges therein, including 75% or 100%. During relatively lower engine load operating conditions, where the demand for power placed on the engine—and therefore the piston—may be relatively lower, fluid may be provided to 50% of the pads 104 or less, such as from 10% to 50%.

Figure 9:
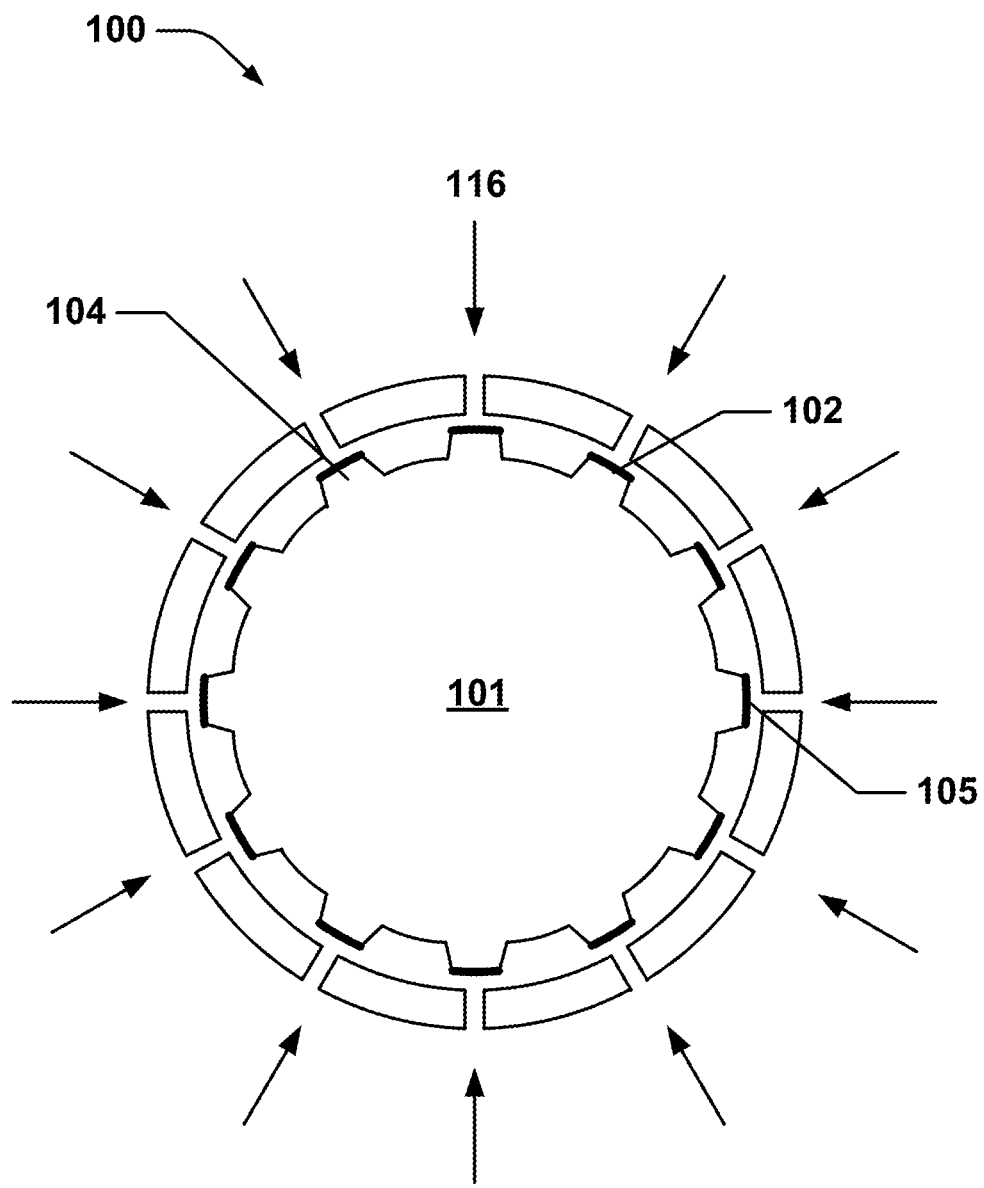
FIG. 9 illustrates the embodiment of FIGS. 7 and 8, wherein lubricating fluid is provided to all of the pad plateaus.
Figure 10:
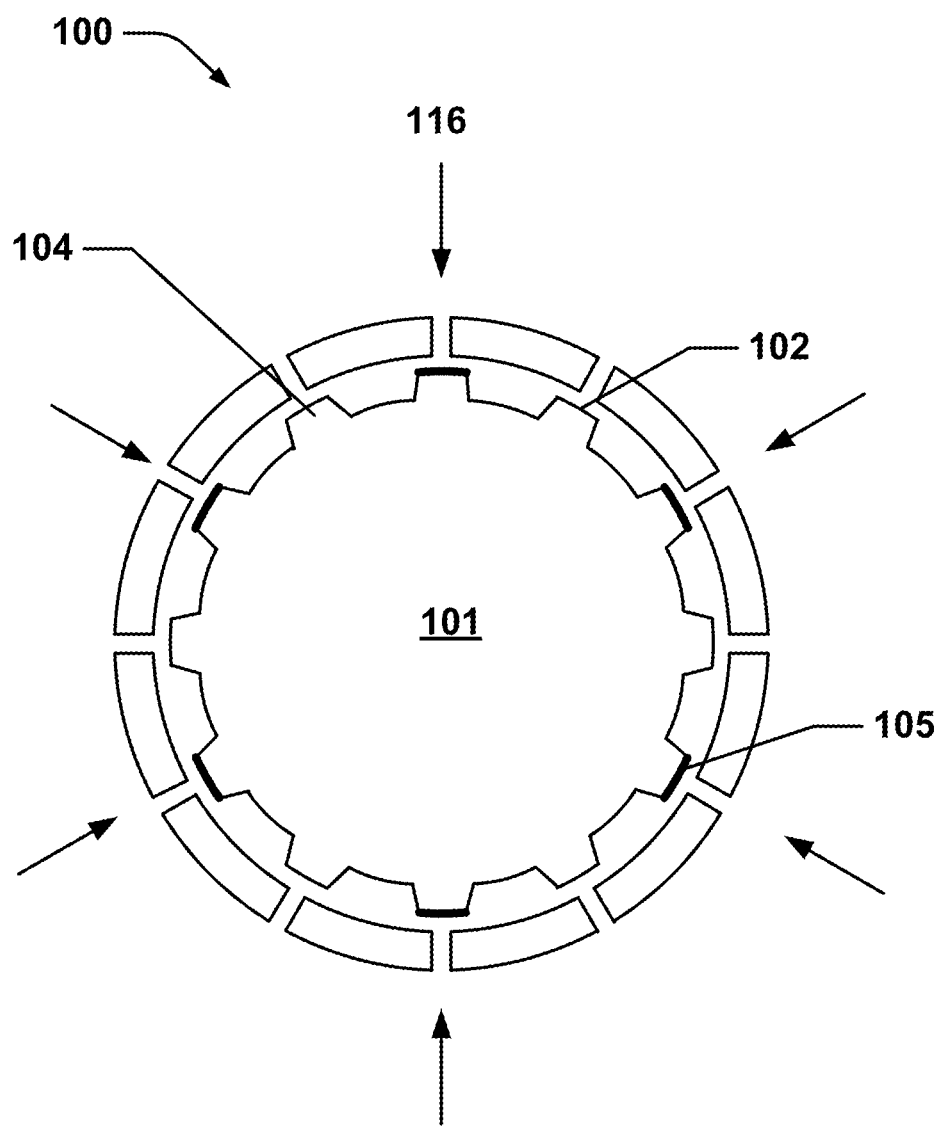
FIG. 10 illustrates the embodiment of FIGS. 7 and 8, wherein lubricating fluid is provided to 50% of the pad plateaus.

Accordingly, varying the fluid provided to the pad 104 may vary the effective bearing surface area of the piston skirt 102. FIG. 9 illustrates an embodiment where lubricating fluid 116 is provided to all of the pads 104, such that the effective bearing surface area may be defined by the surface area, i.e., Wp×Lp, of all of the pad plateaus 105 (illustrated by the thickened lines). FIG. 10 illustrates an embodiment where lubricating fluid 116 is provided to 50% of the pads 104, wherein the effective bearing surface area is defined by the surface area those pad plateaus 105 to which the lubricating fluid is applied (illustrated by the thickened lines).

Figure 11:
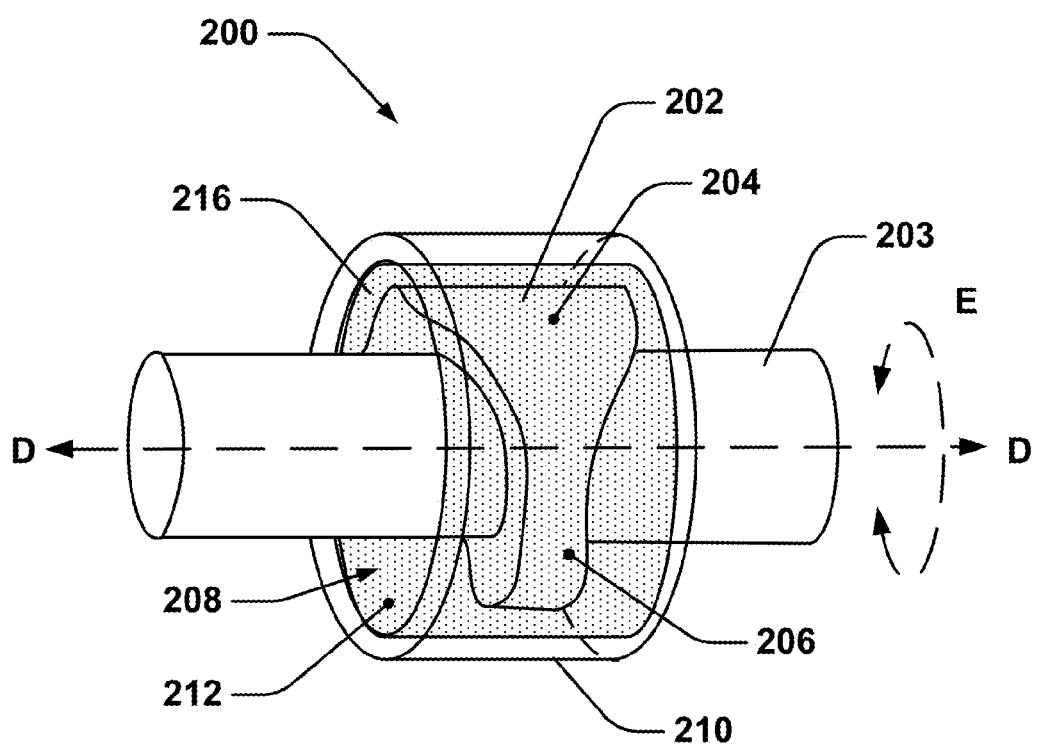
FIG. 11 illustrates a side perspective view of an embodiment of another embodiment of a fluid bearing including rotatable bearing, wherein the rotatable bearing surface area varies around the circumference of the rotatable bearing.
Figure 12:
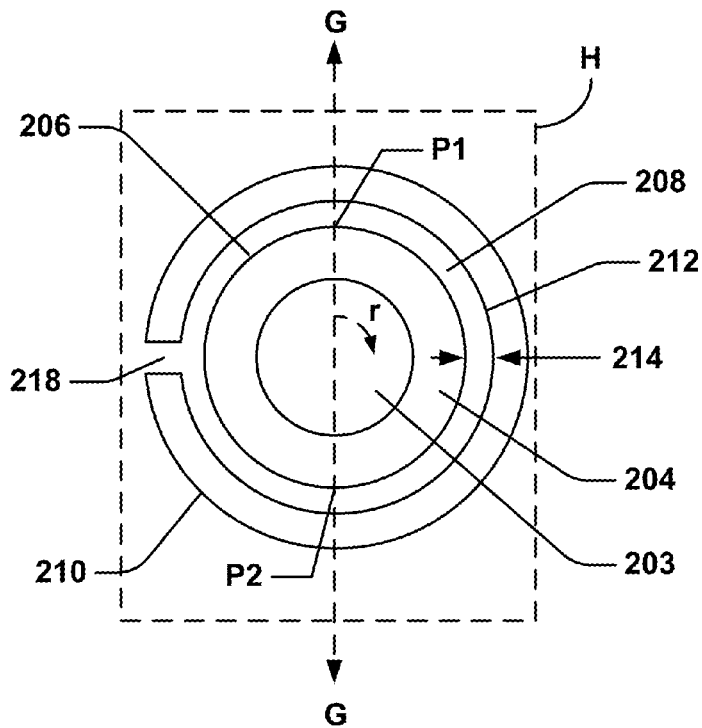
FIG. 12 illustrates a cross-sectional view of the embodiment of a fluid bearing illustrated in FIG. 11, wherein the bearing surface is provided at the external surface of the bearing.

It yet a further embodiment, the dimensions of the bearing surface may be altered around the circumference of a shaft, thus providing a non-uniform bearing area around a portion of or all of the shaft. FIG. 11 illustrates an embodiment of a fluid bearing 200 including a rotatable bearing 202 provided on a shaft 203. The rotatable bearing 202 includes a surface 204 forming the bearing surface 206. The bearing 202 is positioned within the bore 208 of a cylinder 210, wherein the bore 208 may be defined by a cylinder wall 212. Again, the rotatable bearing 202 may be formed integrally with the shaft 203 or may be coupled to the shaft 203. The bore may be generally cylindrical. Referring to FIG. 12, a bearing gap 214 may be provided between the cylinder wall 212 and the external rotatable bearing surface 204. Lubricating fluid 216 (illustrated in FIG. 11) may be provided surrounding the rotatable bearing 202 within the bore 208. Optionally, one or more fluid inlets 218 may be provided within the wall 212 of the cylinder 210. As the bearing 202 rotates, lubricating fluid 216 may be drawn between the bearing 202 and the bore wall 212.

Figure 13:
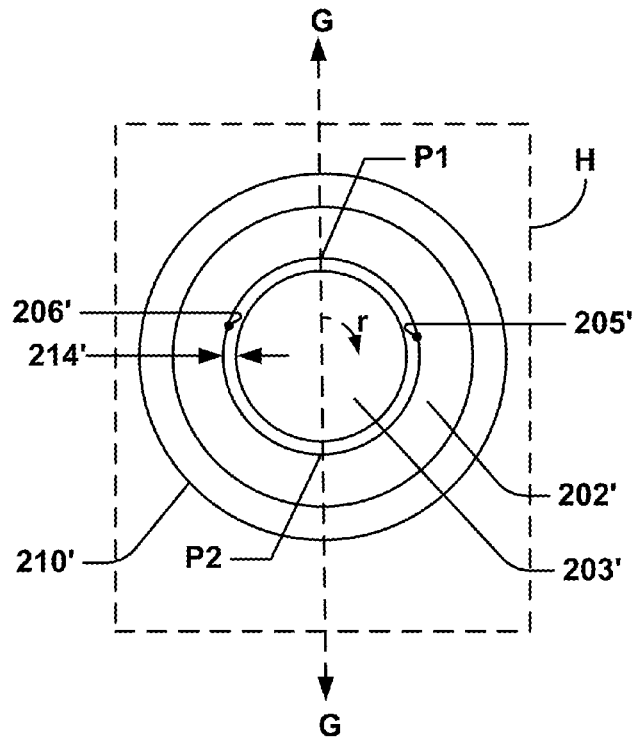
FIG. 13 illustrates another cross-sectional view of the embodiment of a fluid bearing illustrated in FIG. 12, wherein the bearing surface is provided at the internal surface of the bearing.

In another embodiment, the rotatable bearing 202 may be fixed relative to the bore 208 and coupled or otherwise located or otherwise located in a stationary manner to the bore wall 212. For example, the bore wall 212 and rotatable bearing 202 may include keys for mechanically retaining the rotatable bearing in a non-rotating manner relative to the bore wall 212. Referring to FIG. 13, the inner surface 205' of the rotating bearing may provide the bearing surface and interact with the with the shaft surface 203'. Thus, a bearing gap 214' may be provided between the shaft 203' and the rotatable bearing surface 205'. As the shaft 203' rotates, lubricating fluid may be drawn up between the shaft 203' and the bearing surface 206'.

Referring again to FIG. 11, the shaft 203 and/or rotating bearing 202 may rotate around axis D-D in the direction of arrow E. Axis D-D may generally be perpendicular to the opening of the cylinder bore 208 and/or generally parallel to a central axis defined by the bore 208, which as illustrated may be coincident with axis D-D. The shaft 203 and/or rotatable bearing 202 may rotate concentrically or eccentrically around the central axis D-D of the bore 208.

Figure 14:
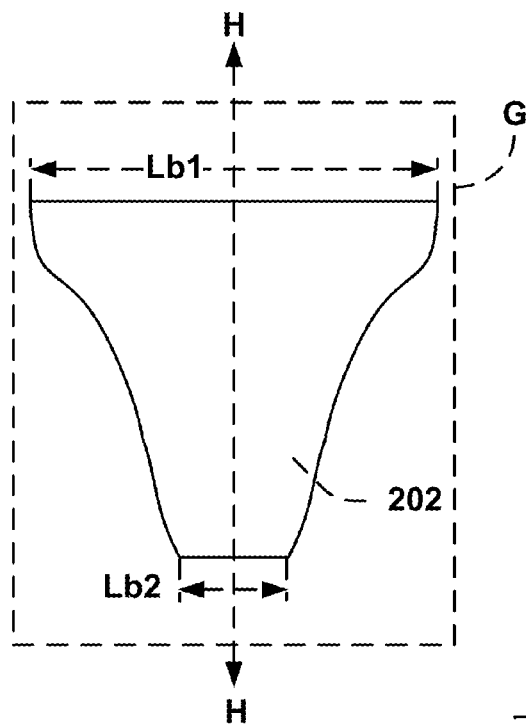
FIG. 14 illustrates a side view of the rotatable bearing illustrated in FIG. 11.

The dimensions of the rotatable bearing 202 may vary around the circumference of the shaft 203. In embodiments, the rotatable bearing surface may define a length Lb that may be generally parallel to the axis D-D of the bore. The length Lb may be altered or varied around the circumference of the shaft 203 at one or more points and, in some embodiments, length of the rotatable bearing 202 may be continuously altered around the circumference of the shaft 203. A first non-limiting example of the change in length around the circumference of a rotatable bearing and shaft is illustrated in FIGS. 11, 12 and 14. The length Lb may decrease from a first length Lb1 at a first point around the shaft circumference to a second length Lb2 at a second point around the shaft circumference, wherein the first point P1 and the second point P2 are 180 degrees apart as measured in direction of arrow r. While it is illustrated that the variation in the length may be symmetrical around plane G-G, perpendicular to the shaft circumference, it may be appreciated that the first point P1 and the second point P2 may be any interval apart, i.e., from 1 to 359 degrees apart in direction of arrow r, resulting in an asymmetrical transition in length around the circumference of the shaft. Furthermore, referring again to FIG. 14, the change in length from Lb1 to Lb2 may also exhibit symmetry around plane H-H, which perpendicularly intersects plane G-G.

Figure 15:
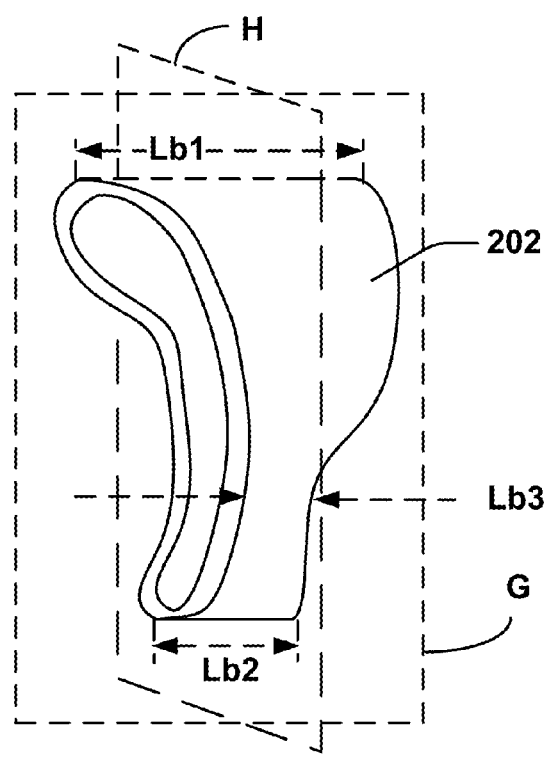
FIG. 15 illustrates a side perspective view of an embodiment of rotatable bearing.
Figure 16:
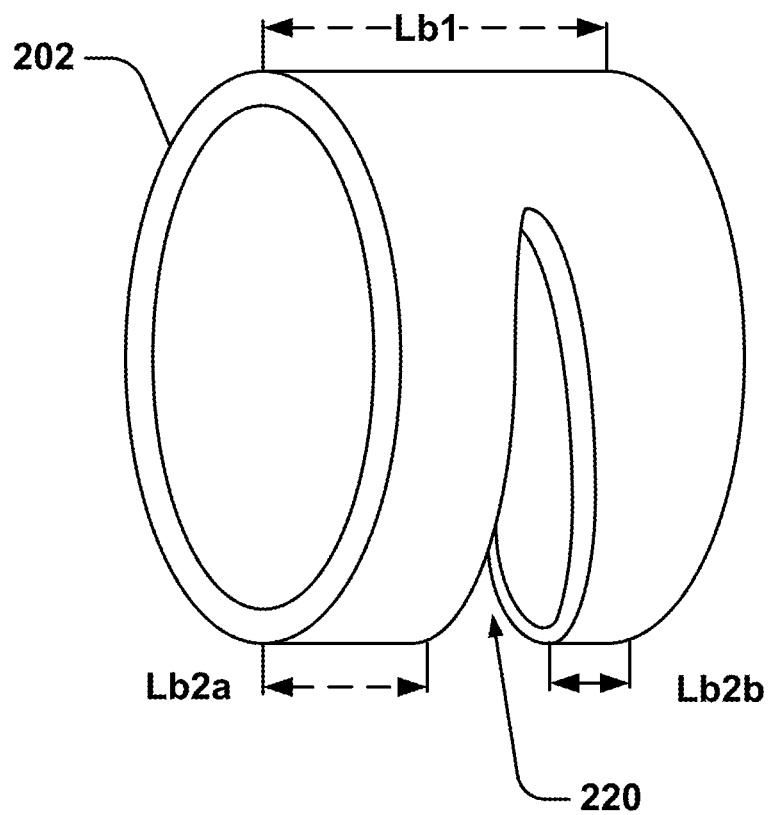
FIG. 16 illustrates a side perspective view of another embodiment of a rotatable bearing.

Another example is illustrated in FIG. 15, wherein the rotatable bearing 202 may exhibit a first length $Lb_1$, a second length $Lb_2$ and a third length $Lb_3$, wherein $Lb_1 > Lb_2 > Lb_3$. As illustrated, the change in length may be asymmetrical around plane H-H. The change in length may also be symmetrical or asymmetrical around plane G-G. FIG. 16 illustrates a further example wherein the rotatable bearing 202 may exhibit a first length Lb1 and a second overall length Lb2, (which is the sum of Lb2a and Lb2b,) wherein Lb1>Lb2. Therefore, as illustrated, the rotatable bearing 202 need not be continuous in length but may define discontinuities such as a notch 220 or other opening in the bearing 202.

The shortest length of the rotatable bearing may be from 5% to 95% of the longest length, including all values and increments therein. Accordingly, as illustrated in FIGS. 14 and 16, Lb2 may be equal to (x)Lb1, wherein x is in the range of 0.05 to 0.95. As illustrated in FIG. 15, Lb3 may be equal to (x)Lb1, wherein x is in the range of 0.05 to 0.95. The greatest effective surface area of the bearing may be provided by the portion of the bearing 202 which exhibits the longest length Lb when it interacts with the bore wall 212 and plus or minus a few degrees around the circumference illustrated in direction r (see FIG. 12). As the bearing contacts the bore wall 212 (or the shaft 203 depending on which one the bearing 202 is coupled to), the effective bearing surface area may be defined by the contact area between the bearing and the bore wall (or shaft). The longer the bearing length Lb, the larger the contact area and effective bearing surface area. Again, the lubricating fluid may be drawn or forced between the contacting surfaces.

Figure 17:
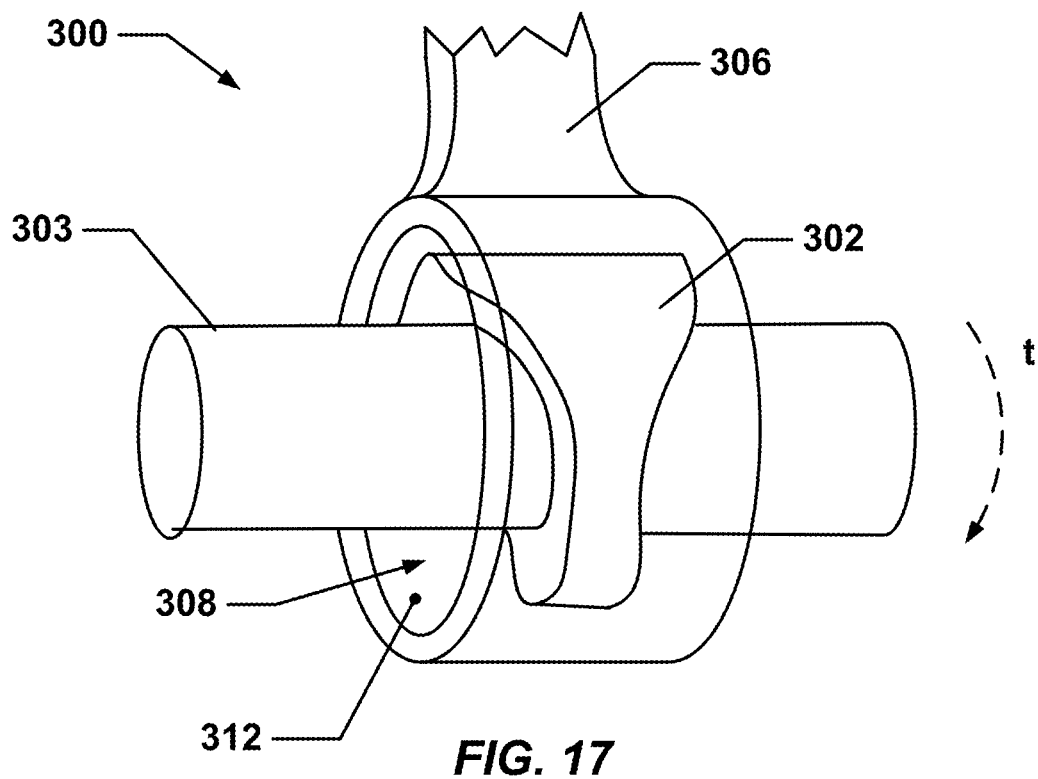
FIG. 17 illustrates a side perspective view of a rotatable bearing provided in a piston rod connector.

The fluid bearing may be cyclically loaded, such as in the case of a crankshaft within an automobile. FIG. 17 illustrates an embodiment of fluid bearing 300, including a rotatable bearing 302 provided on a crank shaft 303 in a cylindrical bore 308 defined in a piston connecting rod 306. In one embodiment, where the bearing is coupled to the crankshaft, as the piston progresses through the compression cycle, the crankshaft 303 turns in the direction of arrow t rotating the rotatable bearing. The effective bearing surface area may change as the surface of the bore wall 312 contacts different points around the circumference of the bearing 302.

Figure 18:
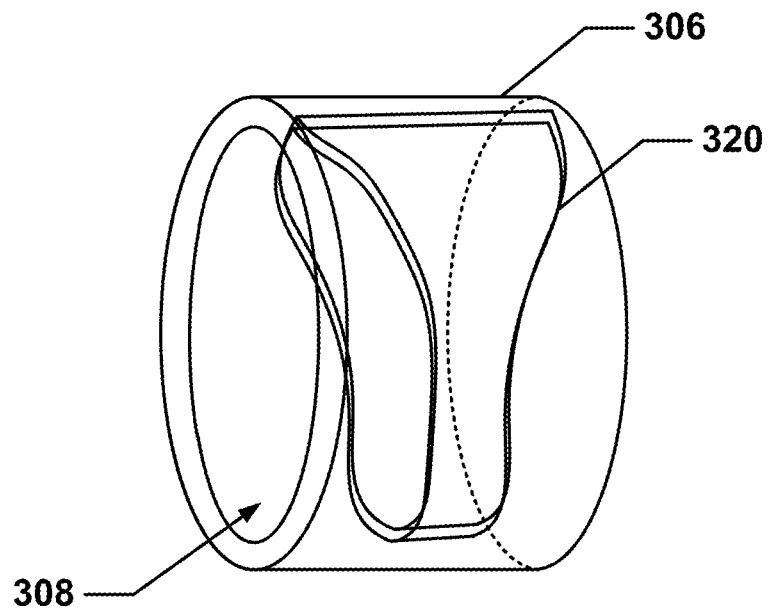
FIG. 18 illustrates a side perspective view of a keyed piston rod connector for retaining the rotatable bearing illustrated in FIG. 17.

In a further embodiment, where the bearing 302 is coupled to or retained by the bore wall 312 defined in a first end of the piston connecting rod 306, as the piston affixed to a second end of the piston connecting rod 306 progresses through the compression cycle, the crankshaft 303 turns in the direction of arrow t and interacts with various portions around the inner circumference of the bearing 302. The effective bearing surface area may change as the surface of the shaft 303 contacts the bearing 302. FIG. 18 illustrates an example of a piston connecting rod 306 defining a bore 308. A recess 320 may be provided on the bore wall 312 for receiving and capturing the bearing 302 in a non-rotating manner relative to the piston connecting rod 306.

Figure 19:
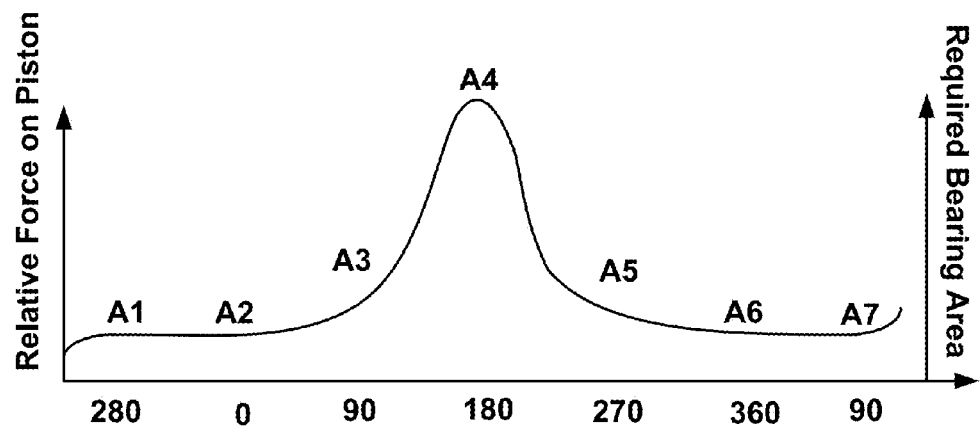
FIG. 19 illustrates a graph of relative force on a piston versus crankshaft angle during an embodiment of a combustion cycle including a schematic illustration of forces on the piston connecting rod and the crankshaft.
Figure 19:
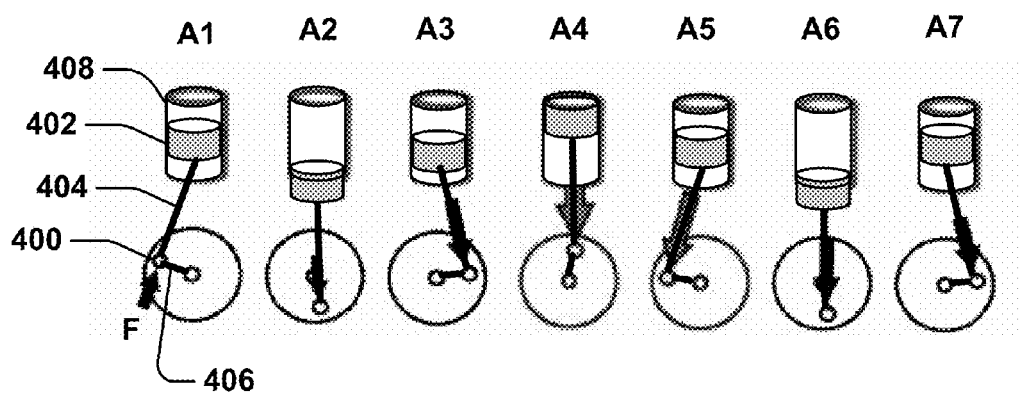

FIG. 19 illustrates a graph of the relative force acting upon the fluid bearing 400 during the combustion cycle of an engine including schematic illustrations of piston 402, connecting rod 404 and crankshaft 406 movement. The forces F on the piston and crankshaft are also illustrated relative to the graph. The combustion cycle may generally begin at intake illustrated as point A1 where air or an air/gas mixture is provided into the combustion chamber. During intake force is applied away from the piston and may act on the lower portion of the bearing. At point A2, the bottom dead center is reached, intake ends and compression and mixing begin. Thus a relatively small amount of force may be applied on the connecting rod towards the piston pushing the piston back up. At point A3, compression continues and the force against the piston increase to drive the piston up in the compression chamber 408 until at point A4 combustions begins at or within a few degrees of top dead center, depending on the type of engine and combustion timing. At the point, the piston applies a relatively large force down towards and against the piston connecting rod and crankshaft. After combustion beings expansion occurs through point A5 driving the piston down and applying force against the crankshaft through to point A6, where exhaust may begin. At point A7 exhaust may continue where the piston is driven up by the crankshaft. The cycle may repeat, beginning again with intake. As seen in the graph, the greatest amount of relative force on the piston occurs around the point where the piston reaches top dead center during the combustion process. The combustion cycle may therefore present a situation wherein the crankshaft may be cyclically loaded by the piston and piston rod. As the shaft moves around, various surfaces of the bearing may contact the surfaces of the bore (or shaft) altering the effective surface area of the bearing. Thus, the cyclically loaded bearing may provide an increase or decrease in effective bearing area to match the load carrying requirements of the bearing.

It may be appreciated that the fluid bearings and methods described herein may be utilized in a number of applications. It is contemplated, for example, that the fluid bearings may be utilized in motors, such as in hard disk drives or motor vehicles. In particular, it is contemplated that the bearings and methods described herein may be utilized in conjunction with cam shafts, crankshafts, superchargers, etc.

The foregoing description of several methods and embodiments has been presented for purposes of illustration. It is not intended to be exhaustive or to limit the claims to the precise steps and/or forms disclosed, and obviously many modifications and variations are possible in light of the above teaching. It is intended that the scope of the invention be defined by the claims appended hereto.

What is claimed is:

1. A method of adjusting the load carrying capacity of a fluid bearing including a bore defining a longitudinal axis and a bearing including a bearing surface, comprising:
   providing a fluid bearing including a bore defined in said fluid bearing wherein said bore has a wall and defines a longitudinal axis, a rotatable bearing positioned within said bore, wherein said rotatable bearing includes a bearing surface and said bearing surface exhibits a length parallel to said longitudinal axis and said length varies at different points around the circumference of said rotatable bearing, and a bearing gap between the wall of the bore and the rotatable bearing;
   contacting a lubricating fluid in said bore with said bearing surface; wherein said lubricating fluid surrounds said bearing surface; and
   cyclically loading said fluid bearing and altering an effective bearing surface area of said rotatable bearing as points around the circumference of said rotatable bearing are contacted by the bore wall.

2. The method of claim 1, wherein said bearing surface is formed by a plurality of piston pads plateaus and altering said effective bearing surface area comprises altering the number of piston pad plateaus said lubricating fluid is contacted with.

3. The method of claim 2, wherein said fluid bearing includes a plurality of lubricating fluid inlets, wherein at least one inlet corresponds to one of piston pad plateaus, and said method further comprises adjusting the flow of lubricating fluid through said lubricating fluid inlets.

4. The method of claim 1, wherein said bearing is laterally displaceable relative in said bore along said longitudinal axis.

5. The method of claim 1, wherein said bearing includes a first length $Lb1$ and a second length $Lb2$, wherein $Lb2=xLb1$, wherein x is in the range of 0.05 to 0.95.

6. The method of claim 1, wherein said bearing includes a first length $Lb1$, a second length $Lb2$ and third length $L3$, wherein $Lb1>Lb2>Lb3$ and $Lb3=xLb1$, wherein x is in the range of 0.05 to 0.95.

* * * * *